US012545460B2

(12) United States Patent
Biondi et al.

(10) Patent No.: US 12,545,460 B2
(45) Date of Patent: Feb. 10, 2026

(54) COUPLING UNIT AND COUPLING METHOD FOR COUPLING A COMPONENT TO A CONTAINER AND APPARATUS FOR PRODUCING ARTICLES CORRELATED THERETO

(71) Applicant: G.D S.P.A., Bologna (IT)

(72) Inventors: Andrea Biondi, Bologna (IT); Luca Cavazza, Bologna (IT); Umberto Zanetti, Bologna (IT); Enrico Campagnoli, Bologna (IT); Antonio Gigante, Bologna (IT); Giacomo Noferini, Bologna (IT); Cristian Dakessian, Bologna (IT); Gianluca Parisini, Bologna (IT); Marco Fiorentini, Bologna (IT)

(73) Assignee: G.D S.P.A., Bologna (IT)

( * ) Notice: Subject to any disclaimer, the term of this patent is extended or adjusted under 35 U.S.C. 154(b) by 384 days.

(21) Appl. No.: 18/006,791

(22) PCT Filed: Jul. 26, 2021

(86) PCT No.: PCT/IB2021/056718
§ 371 (c)(1),
(2) Date: Jan. 25, 2023

(87) PCT Pub. No.: WO2022/029546
PCT Pub. Date: Feb. 10, 2022

(65) Prior Publication Data
US 2023/0264845 A1      Aug. 24, 2023

(30) Foreign Application Priority Data
Aug. 5, 2020  (IT) .................. 102020000019297

(51) Int. Cl.
*B65B 51/22*       (2006.01)
*B65B 7/28*        (2006.01)
(Continued)

(52) U.S. Cl.
CPC .......... *B65B 51/225* (2013.01); *B65B 7/2878* (2013.01); *B65B 29/022* (2017.08); *B65B 43/50* (2013.01)

(58) Field of Classification Search
CPC ... B65B 51/225; B65B 29/022; B65B 7/2878; B65B 43/50; B67B 1/03; B67B 3/00;
(Continued)

(56) References Cited

U.S. PATENT DOCUMENTS 3,488,472 A     1/1970  Pizarro
3,807,133 A  *  4/1974  Simonazzi .............. B67B 3/064
                                               198/383
(Continued)

FOREIGN PATENT DOCUMENTS

DE       102016218218 A1    3/2018
FR          1589459 A       3/1970

OTHER PUBLICATIONS

International Search Report and Written Opinion for International Application No. PCT/IB2021/056718 filed on Jul. 26, 2021 on behalf of G.D S.P.A. Mail Date: Sep. 14, 2021 12 pages.

*Primary Examiner* — Anna K Kinsaul
*Assistant Examiner* — Scott A Howell
(74) *Attorney, Agent, or Firm* — Steinfl + Bruno LLP

(57) ABSTRACT

A coupling unit for coupling a component for a container includes a coupling equipment. The coupling equipment includes: a frame, a housing constrained to the frame, a gripping device rotatably constrained with respect to the frame and including a retaining element to selectively retain the component, and a coupling device constrained to the gripping device with respect to the frame, the coupling device including a coupling element to constrain a portion of the component to a coupling surface of the container at a coupling position. The gripping device and the coupling device can move along an arc with a curved trajectory to a removal position where the retaining element is oriented to receive at least one component to be retained, and to a coupling position where the retaining element and the cou- (Continued)

pling element bring an abutment surface of the container and a couplable portion of the component into contact.

24 Claims, 7 Drawing Sheets

(51) Int. Cl.
*B65B 29/02* (2006.01)
*B65B 43/50* (2006.01)

(58) Field of Classification Search
CPC ....... B67B 3/06; B67B 3/2013; B67B 3/2033; B67B 3/28
See application file for complete search history.

(56) References Cited

U.S. PATENT DOCUMENTS

| | | | |
|---|---|---|---|
| 6,374,576 B1* | 4/2002 | Baini | B67B 3/10 53/342 |
| 2003/0217530 A1* | 11/2003 | Tillack | B29C 65/08 53/469 |
| 2011/0016834 A1* | 1/2011 | Rapparini | B65B 29/022 53/510 |
| 2011/0131933 A1* | 6/2011 | Livingston | B67B 3/20 53/111 R |
| 2015/0027085 A1* | 1/2015 | Rea | B65B 29/022 53/389.1 |
| 2016/0355286 A1* | 12/2016 | Cavazza | B29C 66/849 |
| 2017/0121044 A1* | 5/2017 | Castellari | B65B 7/01 |
| 2017/0275085 A1* | 9/2017 | Rapparini | B65B 29/02 |
| 2019/0144151 A1 | 5/2019 | Mesa Gonzalez et al. | |

\* cited by examiner

COUPLING UNIT AND COUPLING METHOD FOR COUPLING A COMPONENT TO A CONTAINER AND APPARATUS FOR PRODUCING ARTICLES CORRELATED THERETO

CROSS REFERENCE TO RELATED APPLICATIONS

The present application is the US National Stage of International Patent Application No. PCT/IB2021/056718, filed on Jul. 26, 2021, which in turn, claims priority to Italian Application No. IT 102020000019297, filed on Aug. 5, 2020.

DESCRIPTION

The present invention relates to a coupling unit and coupling method for coupling a component to a container as well as to an apparatus for producing articles correlated thereto.

In particular, the container under consideration is also configured to be used as a bulk article.

The present invention finds a preferred, though not exclusive, application in the field of making loose containers such as capsules for infusion type products, for example coffee, a field to which reference may be made hereafter without loss of generality.

A coupling unit for coupling a component to a container generally comprises retaining devices and coupling devices suitable for moving the object of interest and processing it.

Typically, the containers in this technical field are capsule-shaped products (i.e. substantially upturned truncated conical with the widest portion upwards) and made from semi-finished polymeric materials.

Generally, the capsule movement step is carried out by means of a device that moves along with a transporter so as to intermittently reach different stations, including, for example, the coupling station.

Typically, the various discrete process steps involved are carried out at individual stations where the capsule is brought in by the transporter.

In this context, a process is called "continuous" when at each time coordinate the transporter that moves the container has a speed other than zero. This speed under consideration is the speed of the transporter during any processing step leading to the coupling of the component with the container with respect to a fixed reference system and is understood as the speed of the transporter as a whole.

In this context, the term "container" identifies a structure which is formed so as to be able to contain material within it and in particular to be able to confine it at least laterally. In this sense, the material is considered to be "laterally confined" when the shape of the container is such as to retain the material within it even when the container, in its normal condition of use by a user, is inclined with respect to the support plane by a predetermined angle.

This container can be formed by one or more walls according to the content thereof or to specific aesthetic or functional reasons. For example, the container may be a box-shaped body capable of receiving powder, liquid, gel or similar products inside.

According to another example, the container may be cup-shaped or hemispherical and thus composed by only a curved wall. In this case, this curved wall comprises a central base portion which can preferably act as a support surface and a lateral crown which extends radially from the aforesaid base portion and is shaped in such a way as to confine the product inside the container during the envisaged filling or use operations.

In this context the term "container" can be correlated with the term "capsule" of which it is considered to be a broader and more general formulation.

In this context, a first element is defined as "engaged" with a second element when an interaction is established between the two elements such that the first element is able to determine the positioning of the second element. This interaction may be, for example, of a mechanical, magnetic or other nature.

A plane is said "horizontal" when it is parallel to the plane of the ground in which the forming unit object of the invention is installed.

Consistently, the term "vertical" identifies a direction perpendicular to the horizontal plane and so must be understood the terms relating to "higher, lower, upward or downward" positionings or displacements that refer to an orientation along the vertical direction.

In this context, the term "selectively" indicates a method of using a device or similar technical element that allows to freely activate or deactivate it according to preference and also, in case of a plurality of usable devices being present, to select which ones to activate at the same time.

In this context, the term "stable" indicates an engagement of an object with respect to a constraint element for which this object does not change its spatial position while it is held in this way.

In this context, the term "constrained" refers to a firm engagement between two parts which may still allow for specific movements. In other words, the term constrained defines a set of constraint conditions including, for example, constraint with permitted movement, constraint with permitted rotation, constraint with permitted translation, constraint with permitted roto-translation, etc.

In this context, the term "rotation" means the set of symmetry operations that comprise at least one rotation, i.e. a variation of two out of three direction of a spatial triad.

In this sense, therefore, the term "rotation" includes pure rotations of rigid bodies, roto-translations and rotations of a more complex type.

Consistent with this, the term "curved trajectory" does not only indicate a purely rotational trajectory, but a curved line that can result from complex symmetry operations involving at least one rotation and realised by, for example, cam mechanisms, linkages, hinges, etc.

In this context, the term "superimposed" indicates a condition whereby a projection on a reference plane of a first element is found to occupy at least partially the same area as a projection on the same reference plane of a second element.

The Applicant has noted that the processes generally implemented by apparatuses for coupling lids onto capsules involve the lid being transported in a horizontal orientation and then being translated vertically onto the lid to be welded.

It is interesting to note that normally at this stage the capsule is already filled with the desired product and must therefore be moved carefully and in specific directions in order to prevent even a small part of the content from spilling out.

A frequently used way of moving the filled capsule is therefore by a horizontal path that always maintains a vertical orientation of the capsule.

During this trajectory, the capsule arrives at the vertical coupling equipment with its top opening oriented horizontally, and the lid also arrives horizontally so that it is ready to be coupled with the capsule by closing the upper opening.

At this point the equipment moves the lid and, keeping it horizontal, moves it vertically, bringing it into contact with the capsule and welding it.

The Applicant has noted that this method of processing entails limitations on the orientation and possible directions of movement of the lids and containers that significantly constrain the design and spatial organisation of the apparatus in charge of the different phases of processing the container.

In addition, the Applicant has noted that all these separate steps of moving the container are further problematic when the filling product is present in the container, which, due to the volatility thereof, can be unintentionally released from the container.

The Applicant also pointed out that coupling devices that are moved for shorter distances have a longer average life.

Again, the Applicant has noted that a too rapid approach by the retaining and/or coupling device to a filling product such as powder can induce an undesirable air pressure pushing on the filling and can result in an undesirable spillage of the filling, thus making the exact final value of the filling product unpredictable.

The Applicant gas also noted that the solutions presented in the prior art require, due to unavoidable steric encumbrances, that there is always a minimum free space between the position where the component is received by the gripping device and the position of the container surface on which the component is to be constrained.

In addition, the Applicant has found that during an unwanted spillage of dust from the container a fraction thereof can settle on the abutment edge of the container onto which the lid will be welded later, thus risking worsening or even completely compromising the welding.

Finally, the Applicant has found by means of targeted studies and simulations that a grazing direction of air pressure acting on a flat surface of the filling product induces a limited movement of the filling product and thus a reduced spillage from the container.

In addition, the Applicant has noted that such effects of undesirable spillage of filling product also depend on intrinsic characteristics such as, for example, the size of the powders, their shape, their density, etc.

The Applicant therefore has perceived that it was advantageous to be able to arrange the component to be coupled with the container according to different orientations from the one taught by the prior art and that being able to better modulate and control the effect of the thrust of the air on the contents of the container during the phases of approach of the lid to the container could reduce the undesirable effects of movement of the contained powder ensuring that minimal displacements of the retaining and coupling system were realised in order to prolong as much as possible the average life of the coupling unit and increase its productivity.

The Applicant has finally found that the desired optimisation of the aforementioned processes is achieved by realising a unit for coupling a component to a container which is capable of moving the gripping and coupling devices correlated thereto in an efficient manner by minimising the necessary movements, thus reducing the errors that can be produced during such movements and increasing the usability time of such devices, and allowing greater adaptability to the required process conditions depending also on the type of filling product used.

In particular, in a first aspect thereof, the invention relates to a coupling unit of a component for a container comprising a coupling equipment.

Preferably, said coupling equipment comprises a frame and a housing constrained to said frame.

Preferably, said housing comprises at least one seat formed to house said container in a stable manner.

Preferably, said coupling equipment comprises a gripping device constrained to said frame with possibility to rotate with respect to said frame by means of a rotary kinematic mechanism.

Preferably, said rotary kinematic mechanism has a horizontal axis of rotation.

Preferably, said gripping device comprising a retaining element configured to retain said component selectively.

Preferably, said coupling equipment comprises a coupling device constrained to said gripping device with respect to said frame.

Preferably, said coupling device comprises a coupling element configured to constrain a couplable portion of said component to a coupling surface of said container at a predetermined coupling position of said component with respect to said container.

Preferably, said gripping device and said coupling device are configured so as to be able to move by means of said rotary kinematic mechanism according to said rotation along an arc with curved trajectory at at least one of the following positions:

A removal position, in which said retaining element is orientated so as to be able to receive at least one component to be retained, A coupling position, in which said retaining element and said coupling element are placed in such a manner as to bring into contact an abutment surface of said container and a couplable portion of said component.

Thanks to this technical solution, the Applicant was able to move said gripping and coupling device in a precise, effective and reproducible manner.

In addition, the Applicant has noted that this technical solution allows the aforementioned devices to be moved and swung less, thereby increasing their maximum service life.

Even more thanks to this technical solution the Applicant is able design and define the curved trajectory in which the component will approach the container.

In fact, the curved trajectory that can be realised can be a trajectory with a very large radius and therefore be a valid alternative comparable to the technical solutions that adopt a vertical translation, but also with very small radii that therefore entail a reduced movement of the component from the removal position to the coupling position, thus inducing a very limited possibility of product spillage.

Even more, a short movement path of the component to reach the coupling position allows, at the same speed of movement of the gripping and coupling device, to reduce the process times for each individual container and therefore to increase its productivity.

Furthermore, in this way it is also possible to define different types of curved trajectories (e.g. as arcs of ellipses, arcs of circles or arcs of parabolas) that include desired portions of gravitational translations that contribute little to the spillage of content.

Even more, this freedom and adaptability of the usable curved trajectory allows to realise the best rotary kinematic mechanism according to the type of filling product used.

In a second aspect thereof, the invention relates to a method for coupling a component of a container to said container.

Preferably, said method comprises providing a coupling unit comprising a coupling equipment.

Preferably, said coupling equipment comprises a frame.

Preferably, said coupling equipment comprises a housing constrained to said frame comprising at least one seat formed to receive said container in a stable manner.

Preferably, said coupling comprises a gripping device constrained to said frame with possibility to move.

Preferably, said coupling equipment comprises a coupling device constrained to said gripping device with possibility to move.

Preferably, said coupling device is configured to constrain said component to said container at a predetermined coupling position wherein said retaining element and said coupling element are positioned so as to bring into contact with each other an abutment surface of said container and a couplable portion of said component.

Preferably, said method comprises providing said container at said seat.

Preferably, said method comprises rotating said gripping device into said removal position of said component.

Preferably, said method comprises selectively removing and retaining said component by means of said retaining element.

Preferably, said method comprises rotating said gripping device and said coupling device at said coupling position.

Preferably, said method comprises activating said coupling element for a predetermined coupling time so as to produce a stable coupling between said couplable portion of said component and said abutment surface of said container.

Preferably, said method comprises deactivating said retaining element and said coupling element, thereby deactivating the constraint between said retaining element and said component.

Preferably, said method comprises moving said retaining element and said coupling element away from said component to reach said removal position.

Thanks to this technical solution, it is possible to move this gripping and coupling device in a reproducible, precise and effective manner, mitigating or eliminating undesirable oscillations.

Even more, thanks to this technical solution, the applicant is able to design and define the curved trajectory along which the lid are brought closer to the container, thus producing a desired and controlled movement of the lid from the removal position to the coupling position, thus inducing a very limited possibility of product spillage.

Even more, this freedom and adaptability of the usable curved trajectory allows to select the most appropriate rotary kinematic mechanisms according to the type of filling product used.

In a third aspect thereof, the invention relates to an apparatus for producing articles comprising at least one coupling unit made in accordance with the aforesaid first aspect.

In a fourth aspect thereof, the invention relates to a coupling unit of a component for a container comprising a coupling equipment.

Preferably, said coupling equipment comprises a housing, in turn comprising at least one seat formed to receive said container in a stable manner.

Preferably, said coupling equipment comprises a gripping device, itself comprising a retaining element configured to selectively retain said component.

Preferably, said coupling equipment comprises a coupling device constrained to said gripping device and provided to constrain a couplable portion of said component to a coupling surface of said container.

Preferably, said gripping device and said coupling device are configured to move towards said housing in a coupling position, in which they close said at least one housing containing said container and wherein said retaining element is positioned so as to bring into contact with each other an abutment surface of said container and a couplable portion of said component.

Preferably, said coupling equipment comprises an atmosphere modification device, in turn comprising a suction conduit and an inert gas delivery conduit open in said at least one seat and arranged to modify the internal atmosphere inside said at least one seat when said at least one seat is closed by said gripping device and said coupling device.

Thanks to these features, it is possible to change the atmosphere in the housing before the component is coupled to the container. This capability becomes particularly useful when the component to be coupled is a container lid and the latter is filled with a product sensitive to oxidation, such as a food product.

The possibility of changing the internal atmosphere inside the housing when the housing is closed by the gripping and coupling devices can therefore allow the useful life of the products contained in the container to be increased.

In at least one of the above-mentioned aspects, the present invention may also have at least one of the preferred features described below.

Preferably, said coupling device is constrained to said gripping device with possibility to move with respect to said gripping device so as to be able to move from an extended configuration, in which the coupling device is at a predefined non-zero spacing from said couplable portion of said component, to a coupling configuration, in which the coupling device is in contact with said couplable portion.

Thanks to this technical solution, it is possible to obtain a second type of movement of the gripping device only, which can be a specific adaptation with respect to the previously described curved trajectory.

In this way, the movement step of this element towards the retained component can be further optimised to produce the desired coupling.

Even more, in this way it is possible to bring the coupling device close to and in contact with the component only when it is desired to proceed with coupling the component on the container.

This solution is particularly interesting in the case where the coupling element is always active and therefore the actual realisation of the coupling step between the component and the container only occurs selectively when the coupling device is in contact with the component.

In this way, the coupling process can be further managed and optimised.

Preferably, said coupling device is constrained to said gripping device with respect to said gripping device with the possibility to perform a vertical translation when said coupling device is in said coupling position and said vertical translation is configured to reversibly move said coupling device between said extended configuration and said coupling configuration.

This identifies a compact and effective mode of limited movement of the coupling device alone.

Preferably, said rotary kinematic mechanism is a pivot.

Alternatively, said kinematic mechanism is a hinge or a cam mechanism or a system of linkages or similar solutions.

This makes it possible to achieve the desired curved trajectory with a reliable and space-saving kinematic mechanism.

Preferably, said retaining element operates under reduced pressure.

This ensures an effective system of selective constraint.

Preferably, said component is a lid. Preferably, said container is a capsule.

Preferably, said coupling element is a welder.

In this way it is possible to create a solid and lasting constraint between the component and the container.

Preferably, said welder is of the thermal or ultrasonic type.

Thanks to this technical solution, it is possible to create a strong and solid constraint between the component and the container in a very efficient way and in a short time.

Preferably, said removal position is essentially vertical.

This means that the retaining element has its own retaining surface oriented at least predominantly in a vertical orientation.

This facilitates the exchange and removal of components carried by other devices, as this orientation reduces the possibility of collision with kinematic mechanisms or products moving in different directions.

Preferably, said coupling position is essentially horizontal.

This ensures effective control of the container and its contents during the various movement and coupling steps.

Furthermore, providing that the coupling position is horizontal while the removal position is vertical allows reducing the reciprocal dimensions while maintaining the possibility of reversibly passing from one position to another through minimal linear movements of the rotary type.

This is evident if, for example, one considers positioning the seat and the corresponding retaining element immediately adjacent to each other on opposite sides of the rotational kinematic mechanisms, so that after a very short stroke they are already in an overlapping condition.

Preferably, said abutment surface is an upper edge of said container defining an upper opening.

In this way an ideal coupling can be achieved without obstructing the upper opening.

Preferably, said coupling element is constrained to said retaining element with possibility to translate.

This further optimises the movement of the individual parts used in the coupling process, thereby reducing the possibility of further parts being damaged.

Preferably, said housing comprises in said at least one seat a retaining device configured to selectively retain said container when in said seat.

This solution makes it possible to improve and effectively guarantee the control of the container during the desired processing stages.

Said retaining device is preferably a suction cup or similar systems working at reduced pressure.

Preferably, said housing comprises at least one movement device configured to move said retaining device.

Preferably, said movement device is configured to reversibly vertically translate said seat by moving it between a lowered configuration, in which it has a first distance from an upper surface of said housing, and a raised configuration, in which it has a second distance greater than said first distance from said upper surface of said housing.

This makes it possible to move the seat and/or the container housed therein in such a way as to facilitate its removal or release and/or the coupling step.

Preferably, said movement device comprises a vertically translatable piston configured to move between said lowered and said raised configuration.

Preferably, said gripping device comprises a plurality of said retaining elements.

In this way, the productivity of the coupling unit can be increased.

Preferably, this plurality of units of said retaining elements is aligned in parallel or perpendicular directions to specific references.

Preferably, said housing comprises a plurality of seats which can each be superimposed by a corresponding coupling element when in said coupling position.

This makes it possible to couple several components to several containers at the same time.

Preferably, said coupling unit comprising a transporter on which said coupling equipment is housed.

In this way it is possible to combine a movement step with the coupling step described above, making the total process even more industrially advantageous.

Preferably, said transporter is a rotary carousel.

In this way, the transporter used returns to the same reference position after a 360° rotation.

Thanks to this technical solution, it is possible to create a carousel that removes and processes the desired containers quickly and efficiently, minimising the time required by moving along a closed processing path.

Preferably, said transporter comprises a plurality of coupling equipments.

In this way it is possible to further increase the productivity of the coupling unit.

Preferably, said seat and said container, when housed in said seat, move by continuous motion by means of said transporter.

Preferably, said transporter moves at a constant speed.

The Applicant has found that thanks to this technical solution it is possible to carry out the desired machining process in a continuous manner, i.e. by keeping the system always in motion so that the operations produced by the equipment are carried out while it moves uniformly in the space according to its constraint with the transporter.

In fact, in this way it is possible to activate the related kinematic mechanisms with lower accelerations and decelerations than is necessary in the state of the art since all the devices envisaged by the process are included in the and move coherently therewith. This technical solution means that the sum of the times of the individual phases of the movement and coupling process is shorter than with the known intermittent technique, and also increases the average life of the mechanical parts used, since they are not subject to sudden acceleration and deceleration.

It is in fact important to note that the approach adopted in this case by the Applicant appears to be the opposite of the approach whereby the coupler is always at fixed external locations in order to minimise coupling errors. This operating condition arises from the fact that the Applicant has carried out targeted and in-depth studies aimed at verifying that a coupler moving in space is able to operate correctly and reproducibly if it does so with constant speed, and therefore does not undergo significant acceleration or deceleration.

Preferably, said method comprises moving said coupling device from an extended configuration, in which it is at a predefined non-zero distance from said couplable portion of said component, to a coupling configuration, wherein it is substantially in contact with said couplable portion.

In this way it is possible to realise a second type of relative adjustment movement of the gripping device only, which can be a specific adaptation with respect to the previously described curved trajectory.

Preferably, said movement of said coupling device takes place by vertical translation with respect to said gripping device when said coupling device is in said coupling position.

Thanks to this technical solution, said coupling is carried out effectively and quickly.

Preferably, said retaining element used in said method operates at reduced pressure.

Preferably, said retaining element used in said method is a suction cup or similar technical solutions.

In this way it is possible to create a selective constraint while minimising the space required.

Preferably, said coupling element used in said method is a thermal or ultrasonic welder.

Preferably, if said coupling element is an ultrasonic welder and, prior to said step of moving said retaining element and said coupling element back to said removal position, it produces an ultrasonic pulse so as to further detach said component from said coupling element.

This improves the detachment between the coupling element and the component, improving the quality of the process and increasing the cleanliness of the coupling device.

Preferably, said coupling unit used in said method comprises a transporter on which said coupling equipment is housed.

Preferably, said transporter used in said method is a rotary carousel.

In this way, a process can be implemented whereby the coupling automatically returns to a predetermined desired position.

Preferably, said coupling unit used in said method moves according to continuous motion.

Preferably, said coupling unit used in said method comprises a plurality of equipments.

Preferably, said coupling takes place during a rotation of said rotary carousel of approximately 50°.

This optimally balances the radial dimensions of the rotary carousel, the correlated process times and the rotational speeds of the carousel itself.

Preferably, a coupling temperature is between 150° C. and 300° C. for a treatment time between 0.2 seconds and 0.8 seconds, preferably 0.4 seconds.

In this way it is possible to achieve a solid and resistant engagement between the component and the container.

Preferably, the coupling unit is configured to receive a container from a first upstream device according to the process flow.

Preferably, the coupling unit is configured in such a way that it can receive a component from a second, downstream device according to the process flow.

Preferably, the coupling unit is configured in such a way that it can transfer said component constrained to said container to said second device placed downstream according to the process flow.

It is interesting to note that this type of solution is preferred when the transporter is a rotary carousel.

In this way, it is possible, while maintaining the rotation of the carousel, to bring a container picked up by said second device placed downstream and to bring it at a working area where the container is engaged with components received by said first device placed upstream according to the process flow.

In other words, the selective independence of activability of the coupling device with respect to the housing and the rotary carousel configuration makes it possible to remove products from devices located downstream of the coupling unit in question and to bring them to interact with the products supplied from devices placed upstream, increasing the chances of changing collaboration, thus reducing process times and the necessary dimensions.

Preferably, said suction conduit is opened in said housing at an upper opening of said container.

In this way, the oxygen-rich atmosphere inside the container is drawn in more easily and more quickly.

Preferably, said inert gas delivery conduit is opened in said housing at an upper opening of said container.

In this way, the inert gas, delivered at the upper mouth, enters the container more easily and quickly, replacing the atmosphere inside it.

Preferably, the inert gas is a gas with a very low oxygen content, e.g. less than 1%, or more preferably zero.

Preferably, the inert gas is nitrogen or carbon dioxide or mixtures thereof.

Preferably, said suction conduit and said inert gas delivery conduit are opened in said housing from opposite sides with respect to said at least one seat of said container.

This creates a preferential flow of gas from the delivery conduit to the suction conduit through the container in between, which promotes the rapid exchange of atmosphere within the container.

Preferably, said suction conduit and said inert gas delivery conduit are both open in said housing by means of a flange of said housing delimiting said at least one seat at the top.

Preferably, said flange is provided with through-holes connecting said suction conduit and said inert gas delivery conduit with an upper surface of said housing facing said gripping device when the gripping device is closed on said housing.

Preferably, said container, when accommodated in said seat, rests one edge of said upper opening on said flange.

Preferably, in said device, respective recesses open towards said element are formed at said through holes to allow the flow of gas between said delivery conduit of an inert gas and said suction conduit at said upper opening of said container.

In some embodiments, said suction conduit and said inert gas delivery conduit are opened in said housing in an adjustable manner so as to determine the final pressure within said housing when said device and said coupling device are moved to said coupling position.

This adjustment of the pressure inside the housing can positively influence certain characteristics of the coupling process or of the final container obtained from this coupling process.

Preferably, said suction conduit and said inert gas delivery conduit are opened in said housing in such a way as to result in a final pressure below atmospheric pressure when said gripping device and said coupling device are moved to said coupling position.

In this way, the coupling between container and component takes place under reduced pressure conditions.

This makes it possible, for example if the component is a container closure membrane, to obtain a container closed by a membrane which is curved slightly towards the inside of the container, thus presenting a slightly concave external surface. This feature, as well as being more aesthetically pleasing, makes it easier to package the finished containers in a box and to better withstand external low-pressure conditions, such as in air transport.

Preferably, said final pressure is lower than atmospheric pressure by between 50 and 200 mbar.

The characteristics and advantages of the invention will become clearer from the detailed description of an embodiment illustrated, by way of non-limiting example, with reference to the appended drawings in which.

Figure 1:
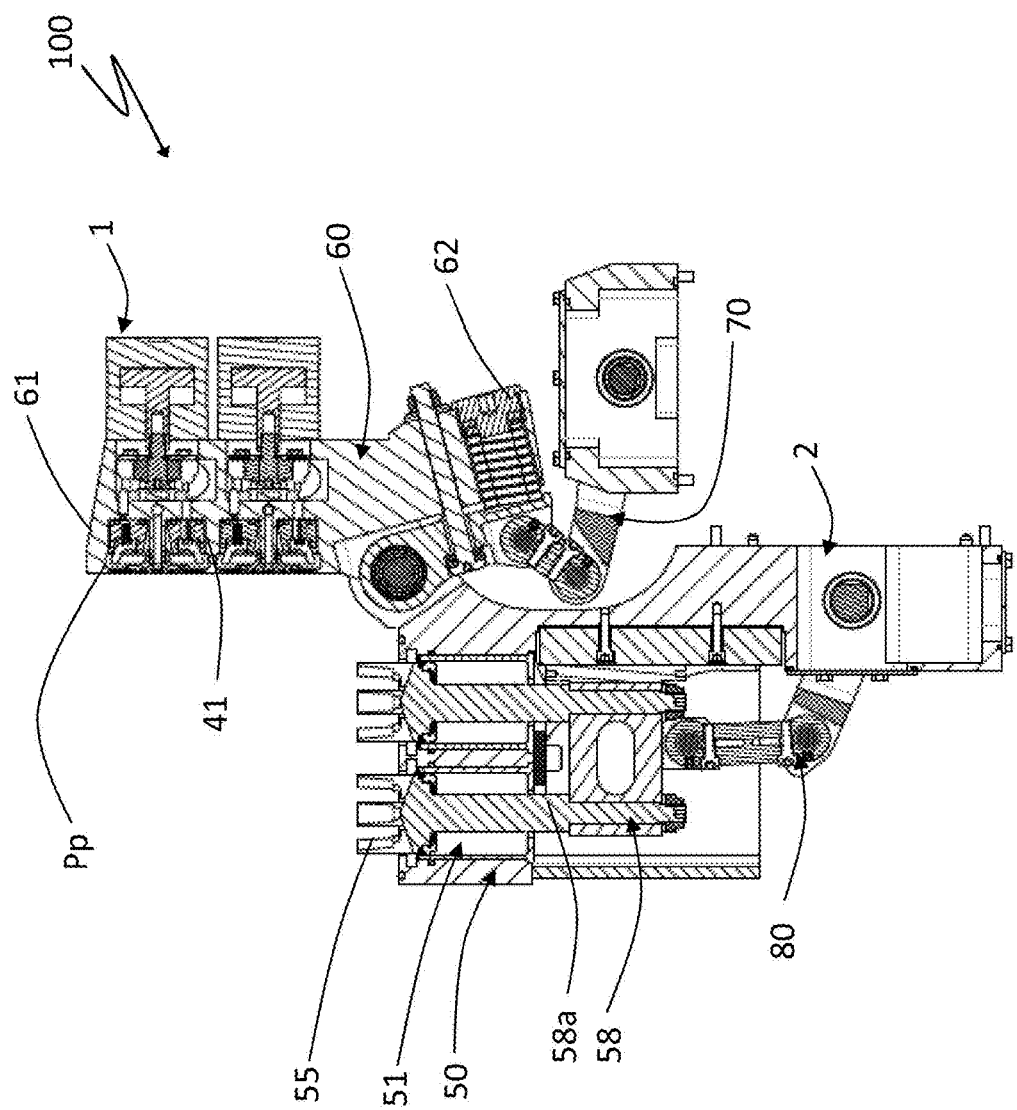
FIG. 1 is a schematic side sectional view of a coupling unit made in accordance with the present invention in a removal position.
Figures 6A, 6B:
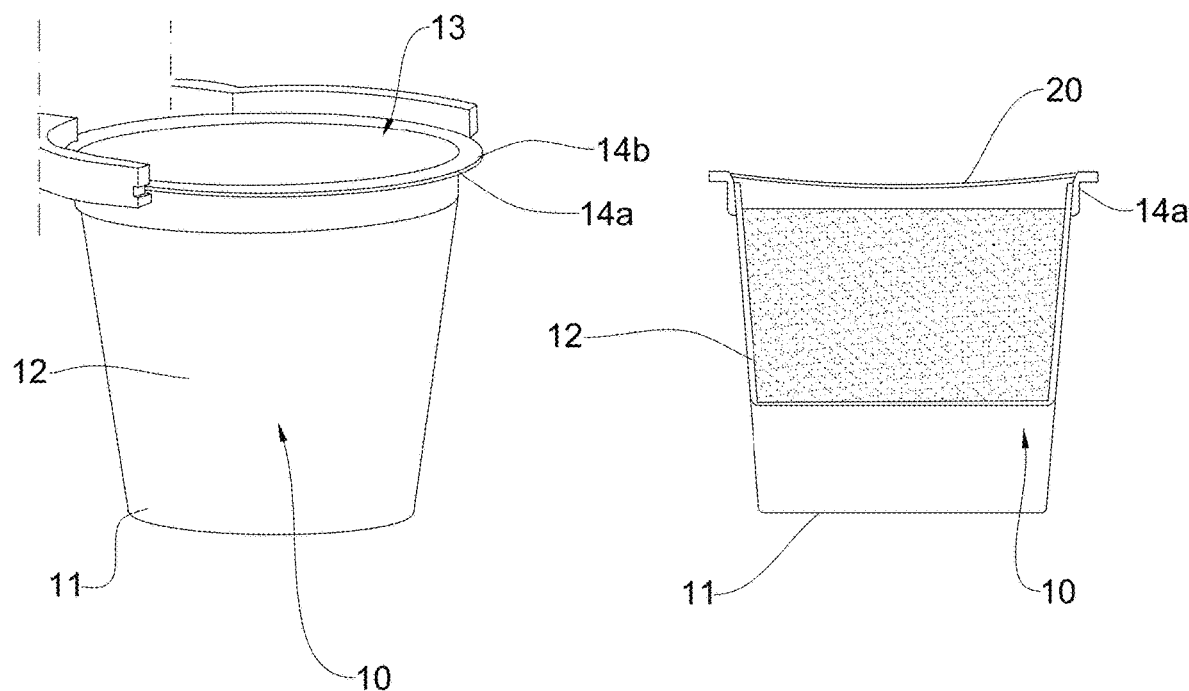
Figure 7:
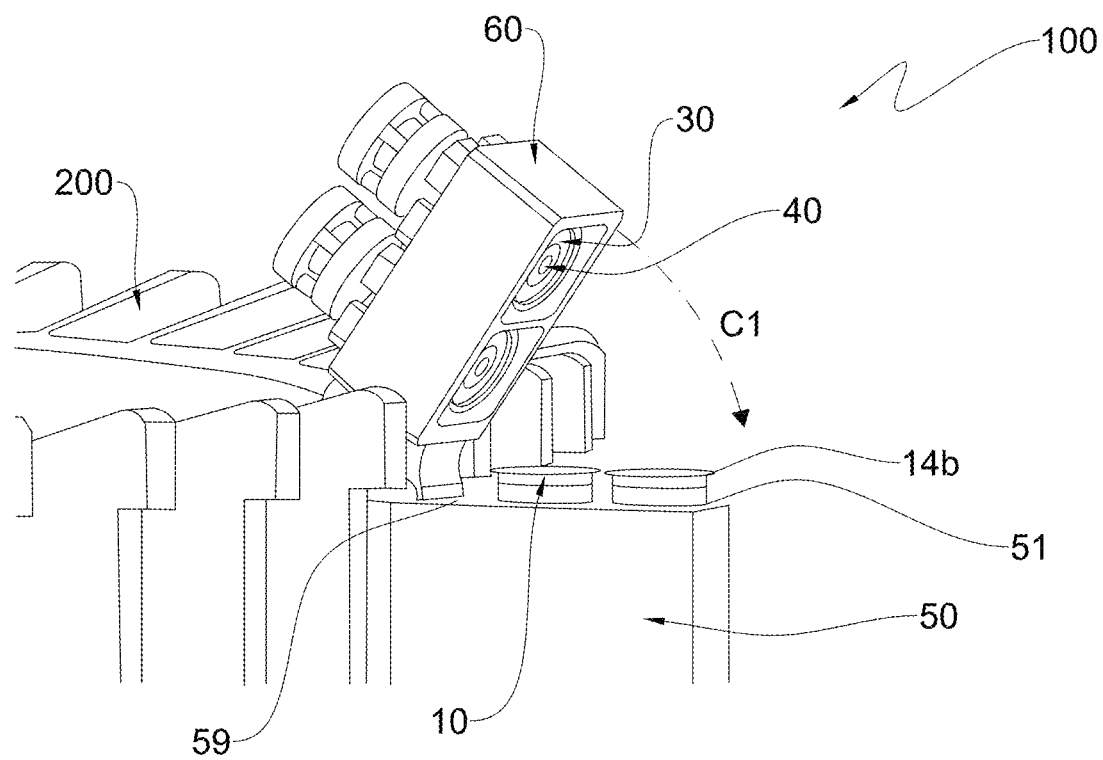
Figure 8:
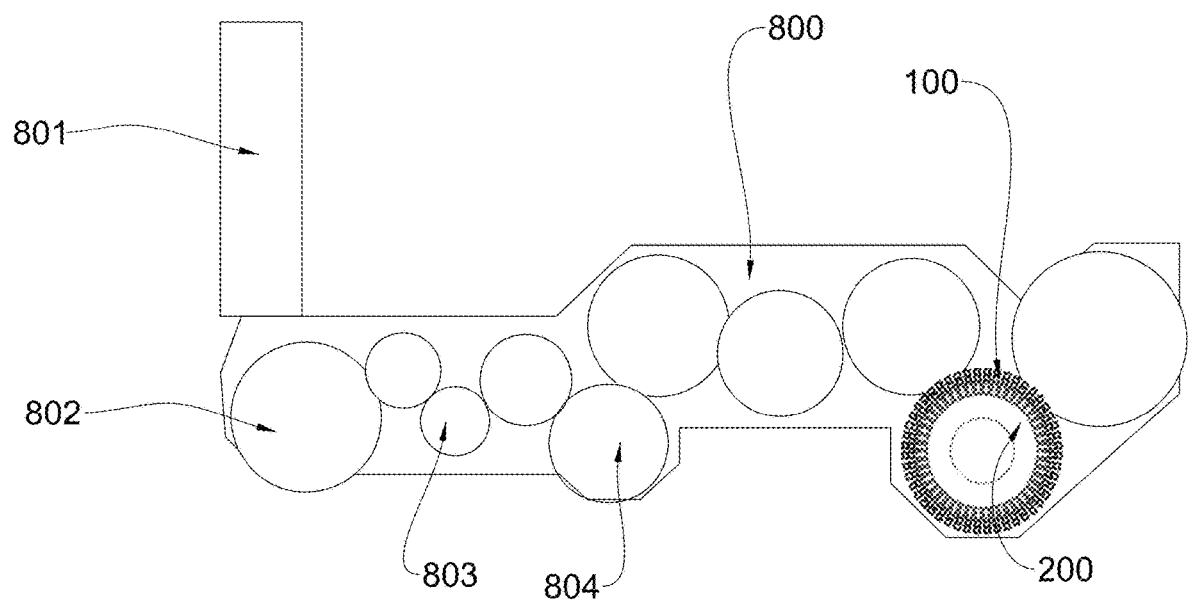

FIGS. 6a and 6b respectively represent a schematic perspective view of a container used by the coupling unit of the present invention and a schematic side elevation view of a container at the end of the coupling process;

FIG. 7 represents a schematic perspective view of the coupling unit of FIG. 1 including a rotary carousel;

FIG. 8 represents a schematic view from above of an article production apparatus according to the present invention.

With initial reference to FIG. 8, 800 indicated an apparatus for producing articles which is arranged to produce a finished container 10, ready for packaging or use.

The apparatus 800 preferably comprises a feeding station 801, a shaping station 802 of a filter, a sealing station 803 for sealing the filter to the container 10, a filling station 804 for filling the container 10.

The example embodiment described below relates to containers 10 in the form of capsules filled with a desired product to which a component 20 is applied.

In the specific case described herein, the containers 10 are capsule elements for the preparation of beverages for infusion, in particular coffee capsules. More specifically, the filler placed inside the capsule is coffee powder.

Preferably, said capsule 10 may be made of multilayer material, for example materials that are composed of layers of PP (Polypropylene) and/or EVOH (Ethylene Vinyl Alcohol) in PET (Polyethylene Terephthalate) or PS (Polystyrene). Otherwise capsule is made of multilayer material with at least one metal alloy layer, e.g. aluminium-based.

In addition, the applied component 20 is a lid of polyamide material. In particular, the lid may be a multilayer polymer laminate in which there is at least one aluminium layer.

Preferably, on the side of the lid facing towards the inside of the container there may be a layer of adhesive material intended to melt and be joined to the container at the time of welding.

Preferably, there may be a layer of a higher-melting material on the outer side rather than on the inner side, which must not melt when heat is supplied to melt the layer arranged on the inner side.

Such a polymeric lid comprises a laminable portion 25 which is effectively heat-weldable to the capsule 10 also made, for example, of polymeric material.

In the present example and as depicted in FIG. 6, the capsule 10 has a substantially upturned truncated conical shape presenting a base 11 of substantially flat and circular shape from which a lateral wall 12 is transversely projected.

This lateral wall 12 is inclined with respect to the vertical line having the smaller diameter thereof at the base 11 and the larger diameter thereof at an upper opening 13.

Again with reference to FIGS. 6 and 7, it can be seen that the lateral wall 12 of the container 10 ends at the top with an edge 14a projecting radially outward the container 10 itself.

An abutment surface 14B is identified on this edge 14A and which is configured to realise a coupling area with the couplable portion 25 of the lid 20.

Preferably, the lid 20 is circular in shape and can be superimposed to the upper opening 13 of the capsule 10 and the couplable portion 25 of the lid 20 is an annular portion that can be superimposed to the abutment surface 14b.

Figure 2:
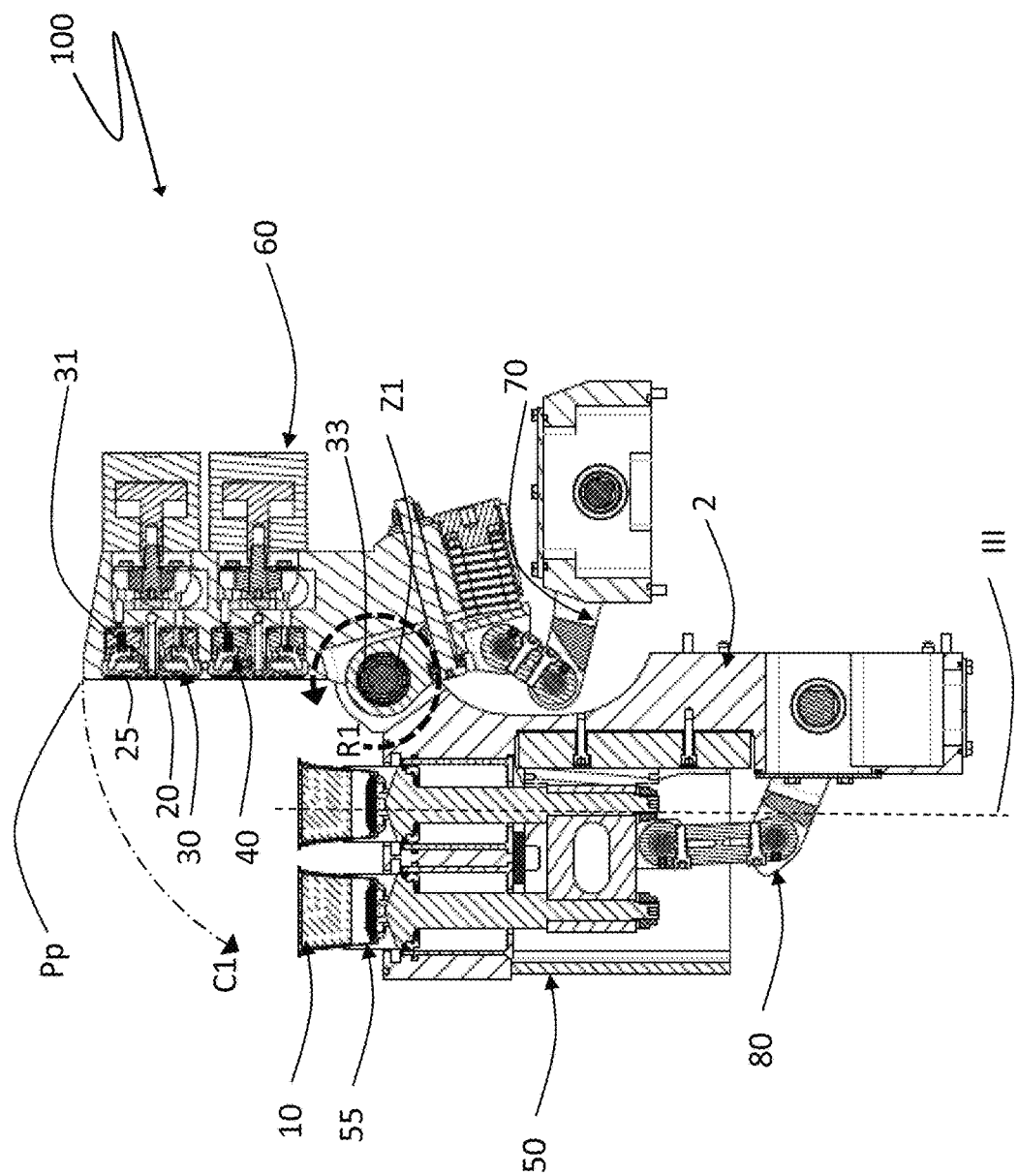
FIG. 2 is another schematic side sectional view of the coupling unit made in accordance with the present invention in a removal position with containers.
Figure 3:
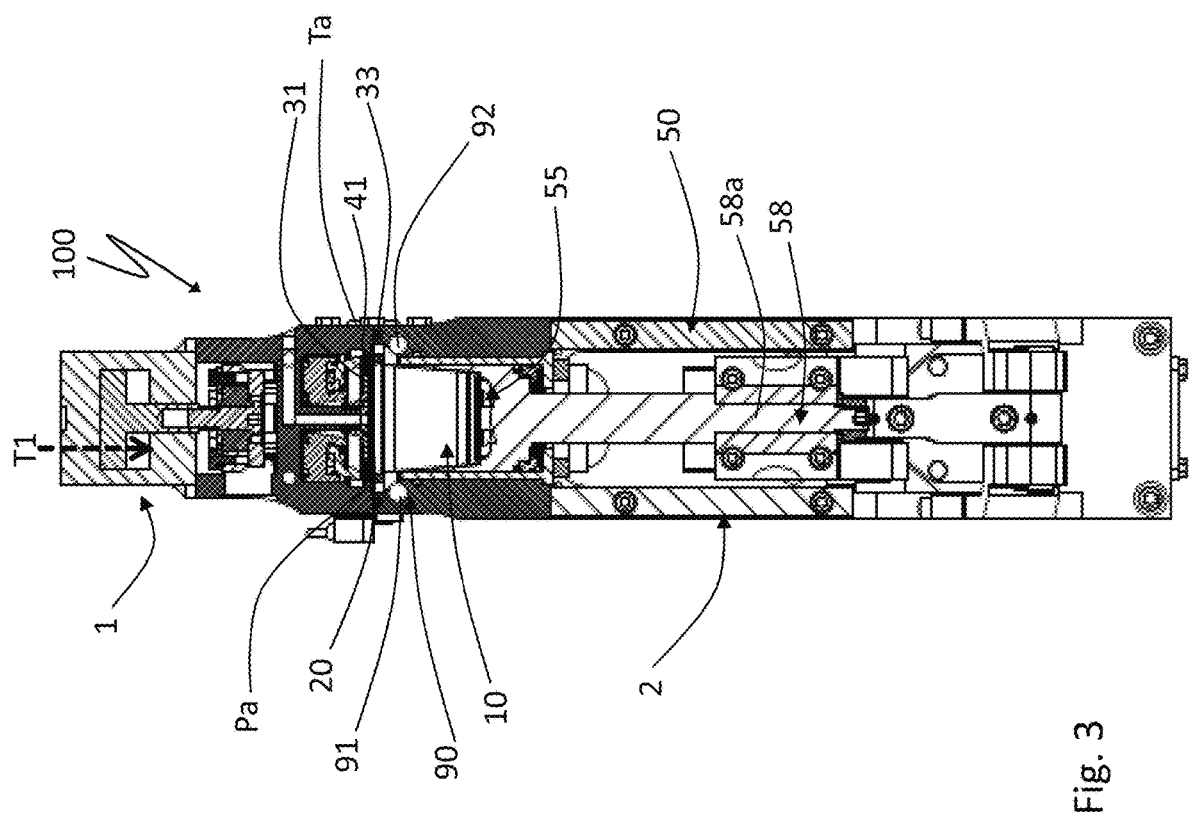
FIG. 3 is a schematic frontal view in section along line III of FIG. 2.
Figures 4, 5:
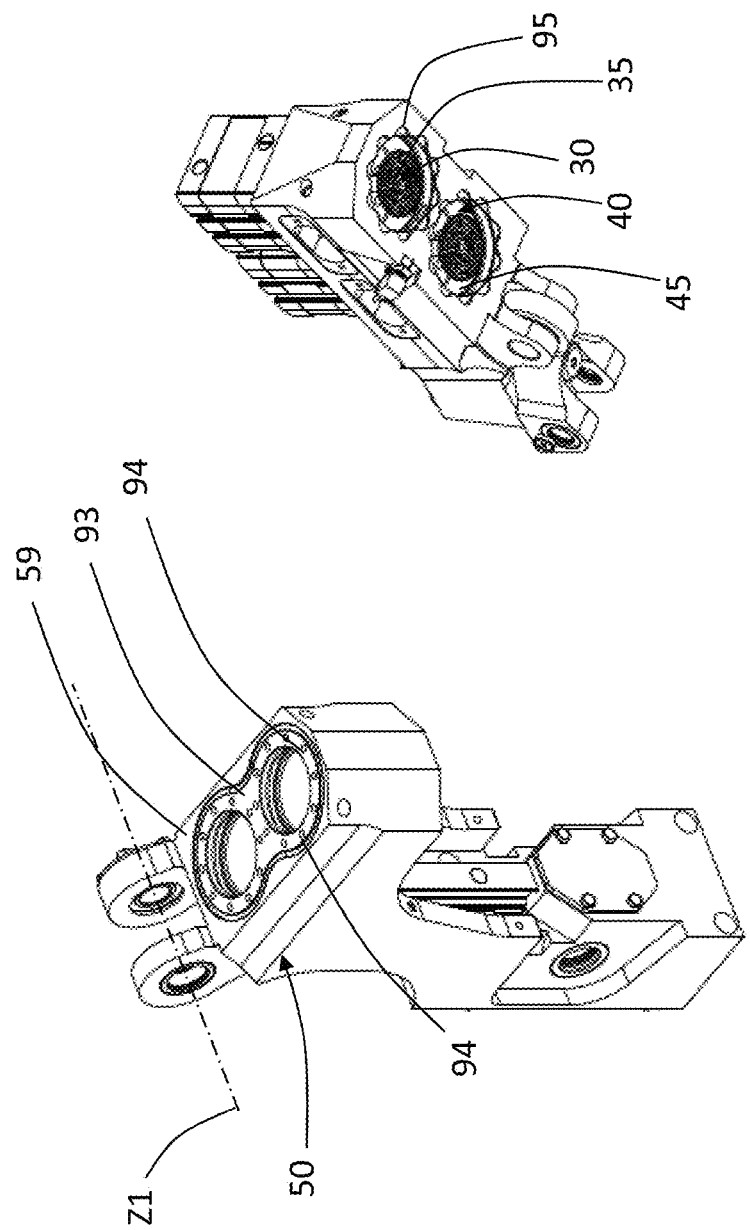
FIG. 4 is a schematic perspective view of a coupling unit housing from FIG. 1.
FIG. 5 is a schematic perspective view of a gripping and coupling device from FIG. 1.

In FIGS. 1 to 3 with 100 is identified a coupling unit of the capsule 10 with the lid 20 comprising a coupling equipment1 in turn comprising:

a frame 2, a housing 50 constrained to the frame 2 and comprising a pair of seats 51 formed to receive the capsule 10 in a stable manner, a gripping device 30, comprising a pair of retaining elements 31, each arranged to retain a respective lid 20 for each capsule housed in the housings 51, and a coupling device 40 comprising a pair of coupling elements 41 each arranged to couple a lid 20 to a respective capsule 10 housed in the seats 51.

Each seat 51 may be a cylindrical recess in which the capsule 10 is housed, and the two seats 51 are preferably aligned according to a sagittal straight line of the coupling unit 100.

The housing 50 includes in each seat 51 a retaining device 55 configured to retain the container 10 when housed in the housing 51.

In one embodiment, each retaining device 55 may selectively retain the container 10 for example by means of a suction cup or similar systems in reduced pressure.

The housing 50 further comprises a movement device 58 configured to move the retaining device 55, and in particular to vertically translate the retaining device 55 by moving between a lowered configuration, in which it is received within the housing 51, and a raised configuration, in which it protrudes from the housing 51, in a raised position with respect to an upper surface 59 of the housing 50.

Preferably and as shown in FIG. 1, the movement device 58 comprises a vertically translatable piston 58a configured to move between said lowered and raised configuration.

Each retaining element 31 is configured to selectively retain the lid 20 to itself and preferably operates at reduced pressure (e.g., suction cup). This engagement condition is depicted in FIG. 1.

In more detail, FIG. 1 represents a configuration of the gripping device 30 and the coupling device 40 in which they are in a removal position Pp, i.e. in which the retaining element 31 is oriented such that it can receive at least one lid 20 to be retained.

Preferably, the removal position Pp is identified by a substantially vertical orientation of the retaining element 31.

From this removal position Pp, the coupling equipment 1 may move towards a coupling position Pa by means of a rotary kinematic mechanism 33 in which the gripping device 30 and the coupling device 40 are rotated towards the housing 50 in such a way as to close the seats 51 and bring the lid 20 into contact with the edge 14 of the respective capsule 10.

This rotary kinematic mechanism 33 is represented in FIG. 2 as a pivot having a horizontal axis of rotation Z1 and interconnected to the frame 2 and to a box-shaped body 60 comprising within it both the gripping device 30 and the coupling device 40.

The box-shaped body 60 is substantially parallelepipedal in shape and has the gripping device 30 and the coupling device 40 at a first end 61 opposite to a second end 62 and the pin 33 is constrained to said box-shaped body 60 at an area identified at an intermediate position between the first and second ends 61, 62.

This configuration allows the gripping device 30 and the coupling device 40 to rotate about said pin 33 according to a same rotation R1 and to perform the curved trajectory C1 to move reversibly from said removal position Pp to said coupling position Pa.

In the cases shown in the Figure, this curved trajectory C1 is preferably an arc substantially equal to 90°.

Alternatively, such a curved trajectory C1 can be an arc of an ellipse or parabola or further curved paths that can be achieved by means of linkages or cam mechanisms.

The coupling device 40 is constrained to the gripping device 30 with possibility to move.

More specifically, the coupling device 40 is constrained to the gripping device 30 with possibility to translate.

As shown in FIGS. 1 to 3, the coupling device 40 translates from an extended configuration, in which it is at a predefined non-zero distance from the couplable portion 25 of said component 20, to a coupling configuration, in which it is in contact with said couplable portion 25. This translation preferably takes place in a vertical direction when the coupling device 40 is in the Pa coupling position.

As shown in FIGS. 1 and 2, the coupling device 40 comprises a coupling element 41 which is a thermal welder.

Such welder 41 is preferably always active and when in the extended configuration is at sufficient distance from the couplable portion 25 so as to avoid the possibility that the lid 20, when constrained to the retaining element 31, may be overheated before being brought into contact with the capsule 10.

Preferably, this predefined distance is between 1 mm and 10 mm.

When the coupling device 30 and the gripping device 40 are brought into the coupling position Pa, the coupling element 41 translates vertically while simultaneously coming into proximity to, or in contact with, the retaining element 31 and in contact with the couplable portion 25 of the lid 20.

In more detail, the coupling element 41 is housed and shaped in such a way as to present a welding surface 45 that ends substantially in planar continuity with a retaining surface 35 of the suction cup 31 when the coupling position Pa is reached.

Alternatively, the welding surface 45 may, in its translational stroke, project outwardly from the retaining surface 35 so as to exert additional pressure on the couplable portion 25 during the welding step.

The retaining surface 35 is substantially circular in shape and preferably has a maximum diameter smaller than the diameter of the upper opening 13 of the capsule 10.

Preferably, this retaining surface 35 is the bottom surface of a suction cup or similar technical solution.

The welding surface 45 is substantially in the form of a circular crown arranged radially external to the retaining surface 35.

The welding surface 45 is shaped in such a way that it can be at least partially overlapped with the abutment surface 14*b* of the capsule 10 when the coupling element 41 is brought into the coupling position Pa.

The coupling equipment 1 further comprises an atmosphere modification device 90 arranged to modify the atmosphere within the seats 51 when the gripping device 30 and the coupling device 40 are moved to the coupling position Pa to close the seats 51.

The atmosphere modification device 90 comprises a suction conduit 91 and an inert gas delivery conduit 92, which are extended into the housing 50 from opposing parts with respect to the seats 51 in a manner substantially parallel to their direction of alignment along the sagittal line.

In particular, both conduits 91 and 92 are connected to a flange 93, superiorly delimiting the seats 51 to form part of the upper surface 59 of the housing 50. In particular, the edge 14*a* of the capsule 10 rests on the flange 93 when it is housed within the respective seat 51.

The flange 93 is also suitably provided with through-holes 94 which place the conduits 91 and 92 in communication with the upper part of the seats 51, so that they are open at the respective upper openings 13 of the capsules 10.

On the gripping device 30, respective recesses 95 open towards the gripping elements 31 are also provided at the through-holes 94 to allow the flow of gas between the inert gas delivery conduit 92 and the suction conduit 91 at the upper opening 13 of the respective capsule 10.

The inert gas supplied from the supply line 92 is preferably nitrogen.

Thus, with reference to FIGS. 1 to 5, the method of coupling the lid 20 to the capsule 10 comprises:

a. Providing the coupling unit 100 with the characteristics described above,
b. Rotating the gripping device 30 to the removal position Pp of the lid 20,
c. Selectively removing and retaining the lid 20 using the suction cup 31,
d. Providing two capsules 10 in the two seats 50,
e. Rotating the gripping device 30 and the coupling device 40 to the coupling position Pa,
f. Translating the welder 41 vertically to the coupling configuration, bringing it into contact with the couplable portion 25,
g. Activating the welder 41 for a predetermined coupling time Ta so as to produce a stable coupling between the couplable portion 25 and the abutment surface 14*b*, i.e., closing the capsule 10,
h. Deactivating the suction cup 31 and the welder 41,
i. Translating the welder 41 vertically to the extended configuration,
l. Rotating the gripping device 30 and the coupling device 40 to the removal position Pp,
m. Starting again from point c.

Preferably, the welder 41 is of the thermal type and applies a temperature between 150° C. and 300° C. for the predetermined coupling time Ta which is between 0.2 seconds and 0.8 seconds, preferably being 0.4 seconds. Advantageously, when the welder is thermal, it can always be left on at the desired temperature and approached or not approached to the lid 20 depending on the desired welding operation. Alternatively, the welder can be an ultrasonic welder and it can advantageously be switched on and off during a welding cycle.

Still preferably, the welder 41 exerts an even pressure on the couplable portion 25 between 45 and 85 Psi.

Preferably, when the gripping device 30 and the coupling device 40 are rotated into the coupling position Pa, and before activating the welder 41, the suction conduit 91 and the inert gas delivery conduit 92 are opened instead. In this way, the air present inside the seat 51 and in particular the air contained in the capsules 10 is substantially replaced by nitrogen, so that once the lid 20 is closed on the respective capsule 10, the product contained therein remains in an inert atmosphere, substantially devoid of oxygen.

In addition, the air intake and nitrogen supply are regulated in such a way as to obtain a final pressure inside the housing 50 which is lower than the atmospheric pressure by between 50 and 200 mbar, maintained at this value by the hermetic closure of the gripping device 30 and the coupling device 40 in the coupling position Pa. In this way, the subsequent coupling process takes place at a pressure below atmospheric pressure and this pressure also remains inside the capsule once it has been hermetically sealed by the lid 20.

Consequently, when the housing 50 is opened again to extract the finished capsules 10, the lid 20 tends to curve slightly inwards towards the capsule, as depicted in FIG. 6b. In this way, the possibility that the lid 20 of the capsule 10 may take on a convex shape, i.e. with a convex outer surface, which could cause some inconvenience during packing, is reduced.

Once the capsules 10 are completed they are lifted vertically for transfer to subsequent workstations.

With reference to FIG. 8, it can be seen that the coupling unit 100 comprises a transporter 200 on which a plurality of coupling equipments 1 are housed.

Such a transporter 200 is a rotary carousel.

Preferably, the plurality of coupling equipments 1 mounted on the rotary carousel is 48.

Again with reference to FIG. 8, the plurality of equipments 1 is mounted by aligning each sagittal line on which the centres of the seat pairs of each coupling equipment 1 pass with respective radial lines of said rotary carousel.

With reference to FIG. 1, it can be seen that the box-shaped body 60 is moved in such a way as to be able to bring the retaining element 31 reversibly from the removal position Pp to the coupling position Pa by means of a first cam system 70.

Similarly, the retaining device 55 is reversibly moved between the lowered configuration and the raised configuration by the drive device 58 comprising a second cam system 80.

Preferably, the step of welding the lid 20 onto the capsule 10 is completed in a rotation of the rotary carousel of between 30° and 180°.

Preferably, the plurality of coupling equipements 1 is constrained on said rotary carousel 200 at its maximum circumference in such a way that the exchange of finished containers with further external devices can be facilitated.

Thanks to this technical solution, the Applicant has demonstrated that it is able to couple at least 1500 components to containers per minute.

The invention claimed is:

1. A coupling unit with a coupling equipment for coupling a component for a container, the coupling equipment comprising:
    a frame,
    a housing constrained to said frame, the housing comprising at least one seat to receive said container in a stable manner,
    a gripping device constrained to said frame, the gripping device i) being configured to perform a rotation with respect to said frame through a rotary kinematic mechanism having a horizontal rotation axis and ii) comprising a retaining element configured to selectively retain said component, and
    a coupling device constrained to said gripping device with respect to said frame, the coupling device comprising a coupling element configured to constrain a couplable portion of said component to a coupling surface of said container at a predetermined coupling position of said component with respect to said container,
wherein said gripping device and said coupling device are configured to move, by said rotary kinematic mechanism in accordance with said rotation, along an arc with a curved trajectory, to:
    a removal position, wherein said retaining element is oriented to be able to receive at least one component to be retained, and
    a coupling position, wherein said retaining element and said coupling element are placed to bring an abutment surface of said container and a couplable portion of said component into contact,
the coupling unit further comprising a transporter accommodating said coupling equipment.

2. The coupling unit according to claim 1, wherein said coupling device is constrained with ability to move, with respect to said gripping device, from an extended configuration with a predefined spacing different from zero from said couplable portion of said component, to a coupling configuration where the coupling device is in contact with said couplable portion.

3. The coupling unit according to claim 2, wherein:
    said coupling device is constrained with ability to perform a vertical translation with respect to said gripping device when said coupling device is in said coupling position, and
    said vertical translation is configured to reversibly move said coupling device between said extended configuration and said coupling configuration.

4. The coupling unit according to claim 1, wherein said retaining element is configured to act at reduced pressure.

5. The coupling unit according to claim 1, wherein said component is a lid.

6. The coupling unit according to claim 1, wherein said container is a capsule.

7. The coupling unit according to claim 1, wherein said coupling element is a thermal or ultrasonic welder.

8. The coupling unit according to claim 1, wherein said removal position is substantially vertical.

9. The coupling unit according to claim 1, wherein said coupling position is substantially horizontal.

10. The coupling unit according to claim 1, wherein said abutment surface is an upper edge of said container defining an upper opening.

11. The coupling unit according to claim 1, wherein said coupling element is translatably constrained to said retaining element.

12. The coupling unit according to claim 1, wherein said housing comprises a plurality of seats configured to be superimposed by a corresponding coupling element when in said coupling position.

13. The coupling unit according to claim 1, wherein said transporter is a rotary carousel.

14. The coupling unit according to claim 1, wherein said seat and said container, when received in said seat, move with a continuous movement.

15. An apparatus for producing articles, comprising at least one coupling unit according to claim 1.

16. A method for coupling a component of a container to said container, the method comprising:
    providing a coupling unit with a coupling element, the coupling element comprising:

a frame, a housing constrained to said frame, the housing comprising at least one seat to receive said container in a stable manner, a gripping device constrained to said frame with an ability to move, a coupling device constrained to said gripping device with an ability to move, the coupling device being configured to constrain said component to said container at a predetermined coupling position, wherein a retaining element and said coupling element are positioned to bring an abutment surface of said container and a couplable portion of said component into contact with each other, providing said container in said seat, rotating said gripping device to a removal position of said component, selectively removing and retaining said component by said retaining element, rotating said gripping device and said coupling device at said coupling position, activating said coupling element for a predetermined coupling time to produce a stable coupling between said couplable portion of said component and said abutment surface of said container, deactivating said retaining element and said coupling element, thereby deactivating a constraining action between said retaining element and said component, and moving said retaining element and said coupling element away from said component in order to reach said removal position, wherein said coupling unit comprises a transporter receiving coupling equipment.

17. The method according to claim 16, further comprising:

moving said coupling device from an extended configuration where the coupling is at a predefined spacing different from zero from said couplable portion of said component, to a coupling configuration where the coupling device is in contact with said couplable portion.

18. The method according to claim 17, wherein said movement of said coupling device is performed by a vertical translation with respect to said gripping device when said coupling device is in said coupling position.

19. The method according to claim 18, wherein said retaining element operates at reduced pressure.

20. The method according to claim 16, wherein said coupling element is a thermal or ultrasonic welder.

21. The method according to claim 20, wherein:

said coupling element is an ultrasonic welder and, before said retaining element and said coupling element moving to return towards the removal position, said coupling element produces an ultrasonic pulse to further detach said component from said coupling element.

22. The method according to claim 16, wherein said transporter is a rotary carousel.

23. The method according to claim 16, wherein said coupling unit moves with a continuous movement.

24. The method according to claim 22, wherein said coupling is performed during a 50° rotation of said rotary carousel.

* * * * *